United States Patent [19]

Davis et al.

[11] 4,330,405
[45] May 18, 1982

[54] VACUUM DISC FILTER

[76] Inventors: Kent L. Davis, 3695 S. 2175 East, Salt Lake City, Utah 84109; Lowell L. Palm, 1013 E. Lowell Ave., Salt Lake City, Utah 84102

[21] Appl. No.: 191,693

[22] Filed: Sep. 29, 1980

[51] Int. Cl.³ .............................................. B01D 33/26
[52] U.S. Cl. .................................... 210/331; 210/486
[58] Field of Search ............... 210/330, 331, 346, 347, 210/486, 232

[56] References Cited

U.S. PATENT DOCUMENTS

| 3,971,722 | 7/1976 | Radford | 210/486 |
| 4,131,548 | 12/1978 | Peterson | 210/331 |
| 4,162,982 | 7/1979 | Chesner | 210/486 |
| 4,179,378 | 12/1979 | Borre | 210/331 |
| 4,207,190 | 6/1980 | Sheaffer | 210/331 |
| 4,216,094 | 8/1980 | Solum | 210/331 |

Primary Examiner—Benoit Castel

[57] ABSTRACT

A vacuum disc filtering system is disclosed wherein each of the discs possesses a separate control for its vacuum, feed, drain and blow discharge. The filter discs are of one piece construction and divided into segments by means of grooved radial arms. The radial arms are adapted to receive a caulking media for holding a filter cloth on each of the segments. The filter disc is true running and any of the discs in a filter system may be operated separately and independently of the other discs.

11 Claims, 8 Drawing Figures

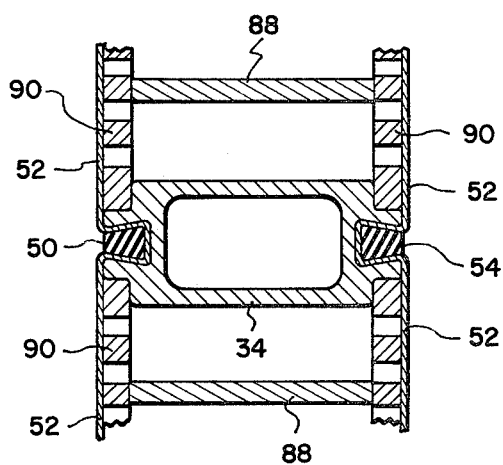
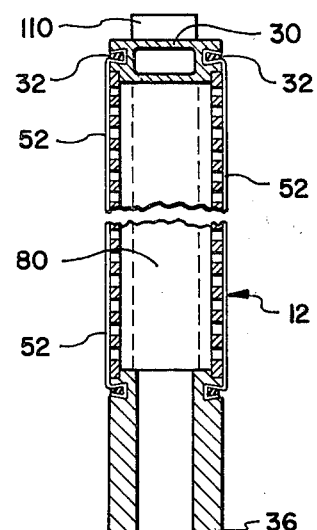
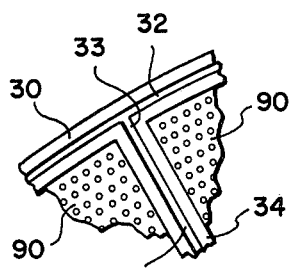
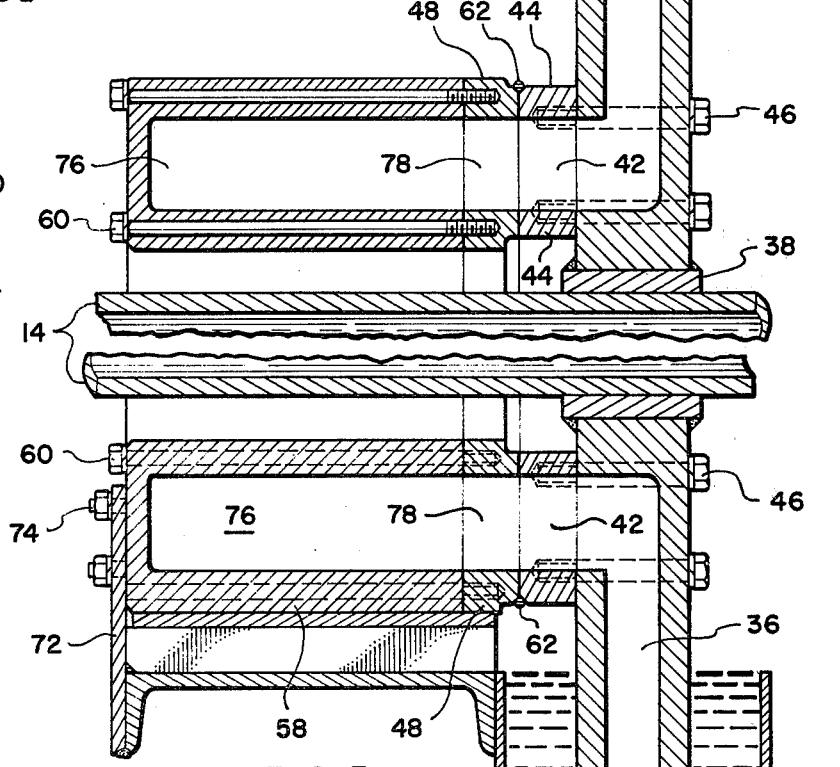
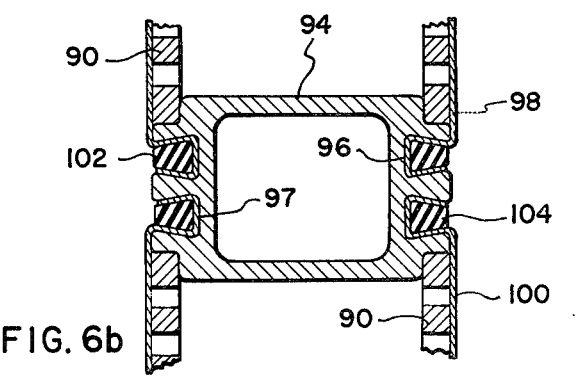
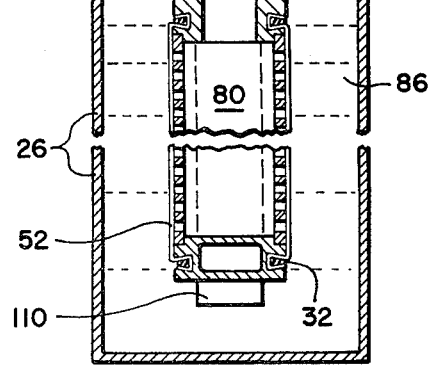

VACUUM DISC FILTER

BACKGROUND OF THE INVENTION

This invention relates generally to the field of disc filters and in particular relates to a true running, one piece vacuum disc filter having independent controls and utilizes a caulking medium for holding the filtering media on the face of each segment of the filtering disc.

Disc filters are well known in the art and have been commonly used for filtering or separating solids from a liquid. For example, disc filters have been used for separating wood pulp from water, separating fine coal from a sludge or concentrates, separating concentrates from copper, lead, zinc, iron and uranium sludge. It is also used in the aluminum industry for separating out aluminum hydrate and in the starch industry for separating and semi-drying starch cakes prior to heat drying.

Disc filters have also been used to separate very fine particulates and immiscible liquids from aqueous solutions by use of precoating techniques.

Essentially all of the disc filters now in operation are constructed from fan shaped segments adjacently secured to produce a disc filter. The resulting disc filter is normally a non-true disc which will wobble or stray from its true zone of rotation during operation. Wobbling is especially prevalent when the segments are removed for the purpose of replacing the filter media. Most all existing disc filtering systems have from one to fourteen discs utilizing a common feed, drain, vacuum and blow discharge.

In some filtering systems, two valves are used. One located at each end of the center shaft. With this type of system at least one half of all the discs in the system must be in use during operation. However such systems are not that common.

This means that all or at least half of the discs are tied into a common system and thus all or at least one-half of the discs must be in use at one time. This also means that the filtering parameters of each of the discs cannot be individually altered. In other words, most of the discs must be started together, operated under identical conditions and that dissimilar materials cannot be filtered at the same time on the same system.

Because there is a tendency for the disc filter to wobble and stray, sophisticated and costly adjustable scraper blades must be employed to insure that most of the filter cake is evenly removed and to prevent inadvertent damage by the blade tearing into the filter media. True running discs are especially essential when an expensive precoating material is used in the filtering process. This insures that only a uniform thin layer of the precoat material is removed during the cake removal process. This insures for a more uniform filter cake and extends the time between precoatings.

One important advantage that can be realized by utilizing independent controls on a disc filtering system is that each of the discs can be started up individually and thereby permit the application of maximum vacuum to each disc during start up. During operation, the filtration rates can be altered by increasing or decreasing the vacuum. This is accomplished by increasing or decreasing the number of discs on stream and thereby compensate for dissimilar feeds or for different feed slurry concentrations. It also prevents backside blinding which is inherent in single valve filters because each disc section reports directly and individually to the vacuum source.

Another important feature of this invention is that the filter media fixed to both sides of the disc filter can be easily and readily replaced. Normally the disc filters are constructed from fan shaped segments held adjacently together by radial rods, arcuate retainer members, clamps and nuts. These rods and retainer members sometimes secure the filter media to the face of the filter segments. In other disc filters, specially fabricated filter bags are utilized to fit over the segmented sections. In either case, the filter segments must first be removed before the filter media can be installed. This limits the diameter size of the filter that can be practically used without the aid of specialized lifting equipment. In the instant invention, this is overcome by providing a continuous fan shaped groove, formed by the grooves on the radial support bars and the peripheral rim. This permits the filter media to be positioned and fixed to each of the segmented faces by means of a caulking media such as rope or polymeric tape. This facilitates replacement of the filter media as removal of the segments is not a condition precedent to replacement of the filter media.

SUMMARY OF THE INVENTION

The above mentioned disadvantages are overcome and the above advantages are realized by the improved vacuum filtering system of this invention. The present invention comprises generally a filter support frame adapted with a plurality of individualized slurry reservoirs, cake collecting bins, vacuum and blow back valves. Each of the discs comprising the filtering system contains a one piece peripheral rim and a center hub connected by equidistant, spaced apart radial arms. The result is a one piece filter disc separated into fan shaped segments by the radial arms. Each side of the peripheral rim and radial arms are grooved to provide an interconnecting, contiguous groove for receiving the filter media and caulking media. This is accomplished by providing grooves feeding out from the peripheral groove to meet with the grooves on the radial arms. The caulking media is forced into the grooves and thereby holds the filter media securely to the face of each of the filter's segments.

A vacuum means is provided and each of the disc filters possesses individual controls or valves for controlling the amount of vacuum applied to an annular manifold located around the hub or center section of the filter. The manifold is connected to an open space such as a plenum, or, in some cases channels, located between the faces of the segmented sections of the filter. In this embodiment, a plenum is utilized. The filter media is separated from the plenum by a pair of perforated face plates welded, or otherwise secured to the filter's peripheral rim, radial arms and hub. The hub is also mounted to a rotatable shaft to which all the disc filters are fixed. The shaft is carried on a support means and rotated by a power source such as a chain connected drive means.

DESCRIPTIONS OF THE DRAWINGS

FIG. 5 is a cross sectional view taken along lines 5—5 of FIG. 3.

FIG. 6a is a cross sectional view of a radial arm taken along lines 6a—6a of FIG. 3.

FIG. 6b is a cross sectional view of another embodiment of the radial arm shown in FIG. 6a.

FIG. 7 is an enlarged partial side view taken from FIG. 3 showing the feeder groove connecting the peripheral groove with the radial arm groove.

DESCRIPTION OF THE INVENTION

Figure 2:
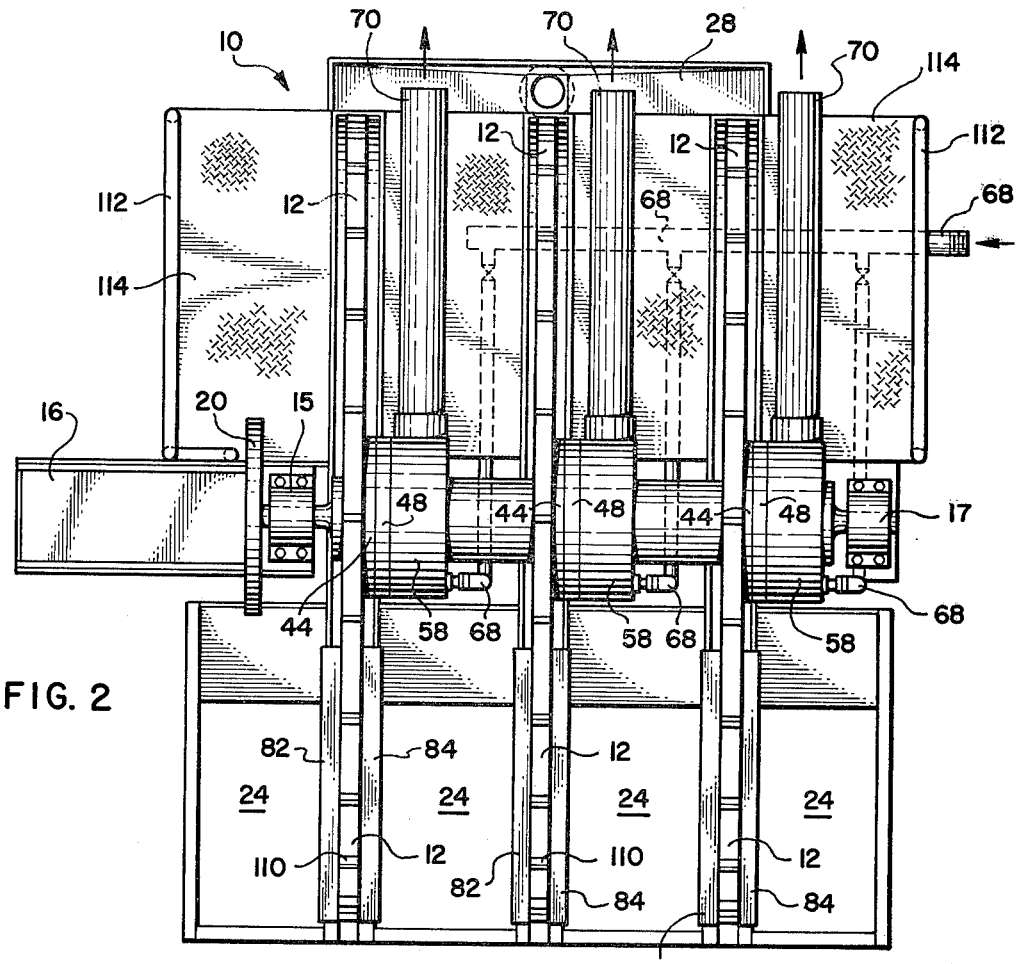
FIG. 2 is a top plan view of the vacuum disc filtering system shown in FIG. 1.
Figure 1:
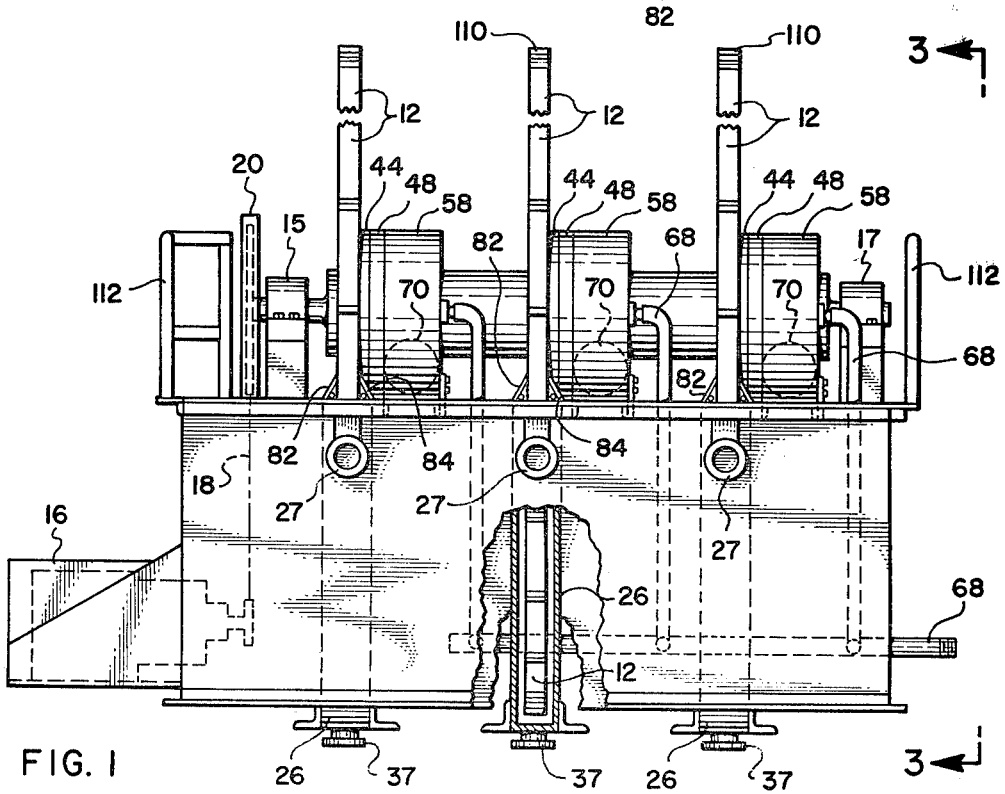
FIG. 1 is a front elevational view of a vacuum disc filtering system utilizing three discs.
Figure 3:
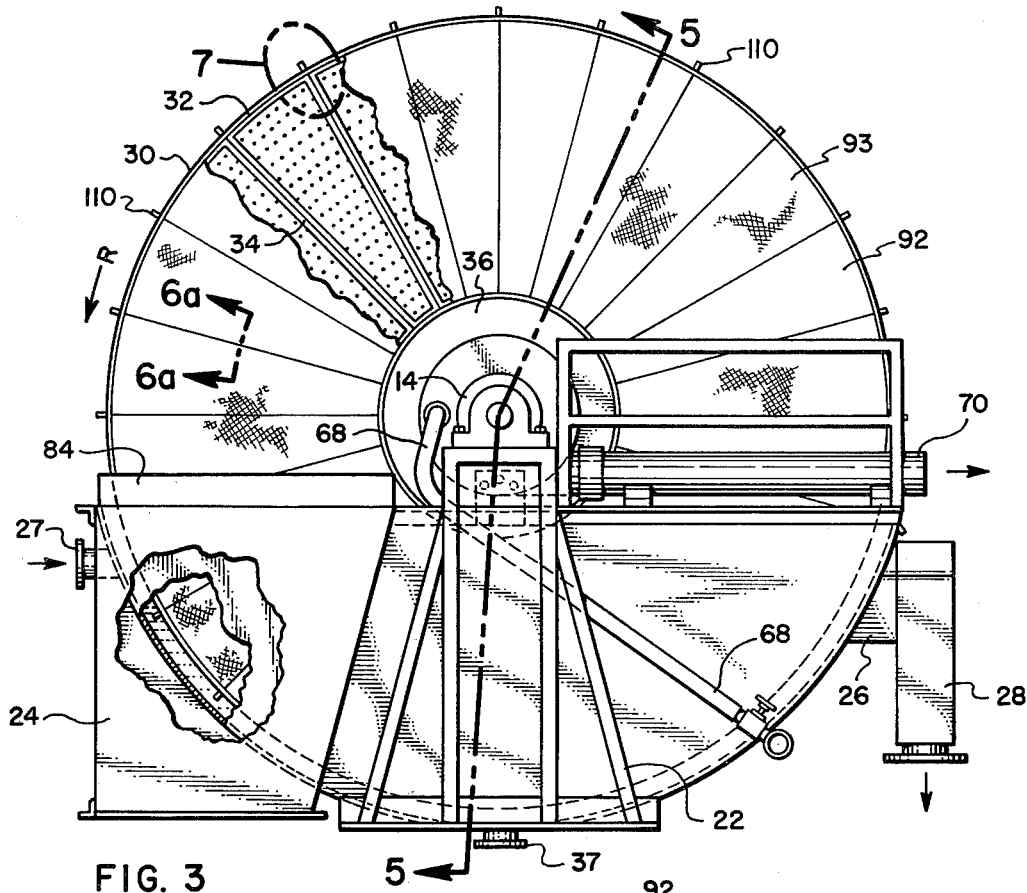
FIG. 3 is an end elevational view of the vacuum disc filtering system shown in FIG. 1.
Figure 4:
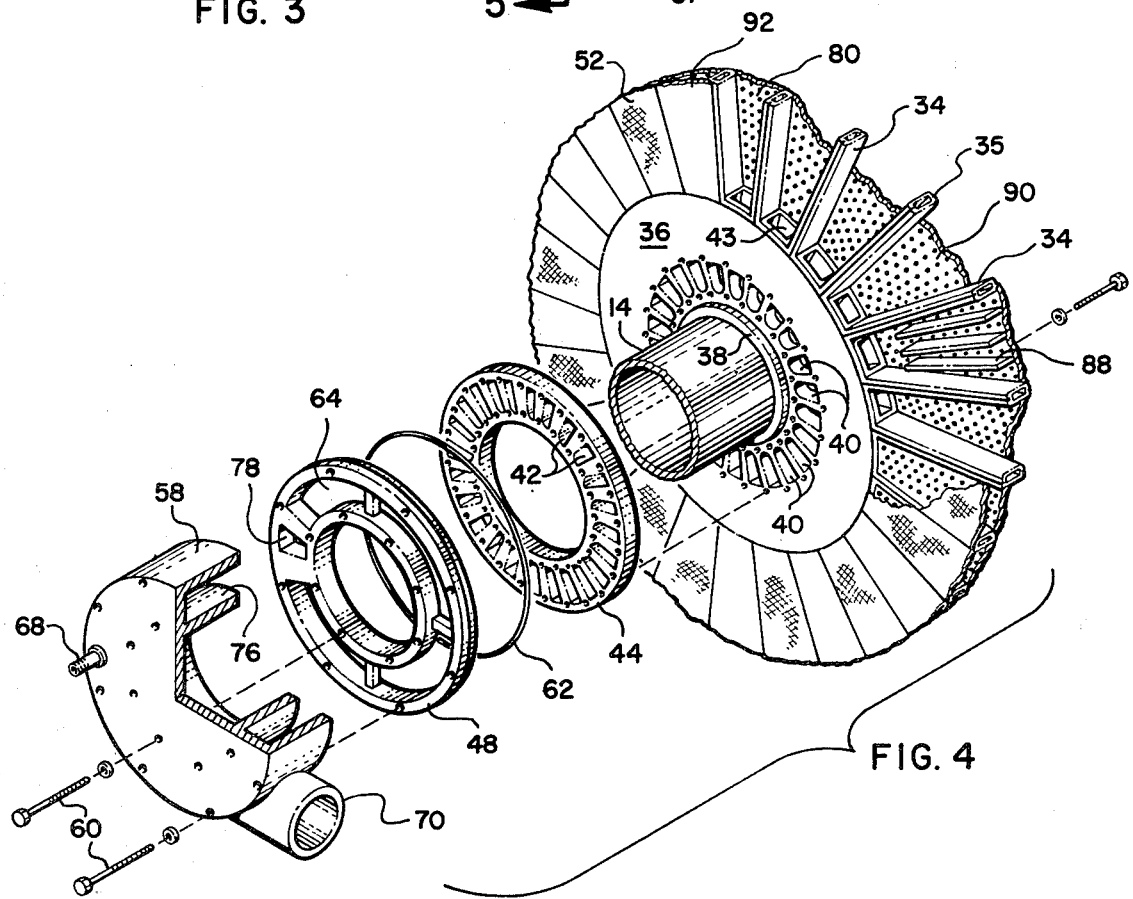
FIG. 4 is an exploded view of a valve and parts assembly used in one of the vacuum disc filters.

As shown in FIGS. 1-7 inclusive and in particular FIGS. 1-3, a vacuum disc filtering system depicted generally by the numeral 10 is shown. As shown, the vacuum disc filtering system is shown to include three discs 12 fixed to a rotatable shaft 14. The shaft is rotated by a geared drive assembly 16 through an interconnecting chain 18 overriding a guarded drive sprocket 20 fixed to shaft 14. The shaft is supported at its journaled ends 15 and 17 on a support member 22 to which is also mounted a discharge chute 24 and slurry feed tank 26 serving each of the discs. Each of the feed tanks also contain a tank drain connector 37 for connecting to a drain line (not shown). A common overflow trough 28 also is provided for the feed tanks 26. Slurry is introduced into the feed tanks 26 through a feed connecting line 27 from a feed source. If dissimilar slurries are being filtered, the overflow trough is normally segregated.

Each of the discs include a continuous peripheral rim 30 having a groove 32. Interconnected therewith are periodic radial feeder grooves 33 for interconnecting with grooves 50 of radial support bias 34 to eventually form a fan shaped interconnecting, contiguous groove. This groove is similar to the grooves 50 and 102 shown in FIGS. 6a and 6b respectively. As shown, the grooves are preferably trapezoidally shaped for holding the filter media 52 and caulking media 54 firmly within the grooves 50. However other shapes may be used as long as the mouth of the groove has a width of less than the major width of the groove. Extending radially from the peripheral rim 30 are a plurality of radial support bars 34 having the above described trapezoidal grooves 50. The ends of these bars are welded or otherwise fixed to a manifold 36 having a hub or collar 38 which is permanently fixed to the rotatable shaft 14. The manifold 36 has a plurality of openings 40 in communication with ports 42 cut into wear plate 44. The wear plate 44 is fixed to the manifold by bolts 46. The wear plate rotates against a valve face 48 held by a valve housing 58 and bolts 60. An "O" ring 62 is positioned between the wear plate 44 and valve face 48 to insure against leakage or loss of vacuum during operation. The valve face contains a vacuum port 64 and a blow port 66 which are in communication with a blow connector line 68 and a vacuum connector line 70. The valve housing 58 is stationarily fixed to the support member 22 or slurry tank 26 through an intermediate spring loaded bracked 72 and bolts 74. With the above arrangement, rotation of the shaft 14 causes the filter disc 12 to rotate through the slurry feed tank 26. A vacuum is applied to the filter through vacuum line connector 70. The valve housing 58 is divided into a vacuum zone 76 and a blow zone (not shown). As the filter disc 12 and attached wear plate 44 are rotated, ports 42 are in communication with the vacuum zone 76 for a substantial period of time. For a short period of time, one of the ports 42 of wear plate 44 is in communication with the blow zone. At this point, the vacuum is terminated and pressurized air is introduced through a blow connector 68. The pressurized air passes through the blow zone (not shown) and into and through a blow port 78. The pressurized air then enters one of the ports 42 of wear plate 44 and thence into one of the segmented plenums 80 of the disc filter 12 through communicating port 40 located in the manifold 36. The pressurized air enters the segmented plenum 80 at a point in time when the air filter disc approaches the angular positioned cake removal blades 82 and 84 mounted along the side edges of the discharge chutes 24. The cake is formed on the filter media 52 during the time the filter disc rotates within a slurry 86 contained in feed tank 26. As vacuum is applied to the filter disc, the liquid passes through the filter media and flows through the segmented plenum 80 and into the manifold 36. The liquid exits through a vacuum connector line 70 after passing through ports 40, 42 and 64. The solids contained in the slurry are collected on the filter media. Depending on the speed of rotation of the disc and the concentration of solids in the slurry, a cake of varying thickness is formed on the face of the disc. As the disc leaves the slurry, a vacuum is continually applied to the cake to provide for semi-drying until it reaches the area near the cake removal blades. At that point the vacuum is shut off and a surge of pressurized air is introduced. This pressurized air in combination with the cake removal blade directs the semi-dried cake into the cake collecting discharge chutes 24. The pressurized air also tends to clear the filter media of clinging small pariculates and thereby minimizes "blinding".

In between the trapezoidal grooved radial arms 34 a plurality of radial ribs 88 are inserted for structural support of the perforated fan shaped face plate 90 which covers both sides of the filters' segments 92. As earlier stated, the perforated face plates may be replaced by plastic or wooden channeled grid plates. However for large filters, the perforated face plate is preferred. A fan shaped filter media 52, such as a cloth, covers the perforated metal face plates 90. The filter media 52 is cut somewhat larger than the shape of each filter segment 92 so that it will possess an overlap. The overlap is placed into the trapezoidal groove 32 of the peripheral rim 30 the trapezoidal groove 50 of the two adjoining radial arms 34 and 35 and the feeder groove 33. A caulking media 54, such as a rope or other type of compressable or flexible material is then forced into the trapezoidal grooves with, for example, a wooden mallet. As the caulking media enters the grooves, the filter media 52 a tightened and held against the perforated metal face 90 of the disc. As shown in FIG. 6a, there is only one groove on the radial arm. This means for example, that one side of the filter media from segment 92 and one side from its adjoining segment 93 would be held in position by the same radial arm. In FIG. 6b, the depicted radial arm 94 contains a pair of trapezoidal grooves 96 and 97. This permits the filter media 98 to be replaced without disturbing the filter media 100 on the adjoining segment. Each segment will therefore be independent of its adjoining segment. As with radial arms having a single groove, a caulking media 102 and 104 are used to hold the filter media 98 and 100 against the perforated face plate 90.

The disc filter just described is a welded single piece construction. The filter segments are non-removable. This means that once the filter disc is constructed and fixed to a shaft, there is little opportunity for the disc to wobble during operation. After all of the discs are fixed to a shaft and mounted, the discs can be trued by applying a guided grinding wheel to the face of the disc and ground to insure a true running disc.

In addition to the use of permanently fixed scraper blades for removing a filter cake, a pair of synchronized movable blades may also be used particularly if a precoat cake is used in the filtering process.

In this type of use, a true running disc is highly advantageous as an exact predetermined amount of the filter cake and precoat material will be removed during the removal process.

In addition to the use of scraper blades for removing filter cake, a tapered roll discharge system may also be employed, if desired.

The above filtering system can, with minor variations, also be run in a mode wherein the vacuum is continuously applied and the filter cake is removed only by the scraper blades. In this mode a thin bed of cake is retained on the filter media and functions as a precoat. If during use, blinding occurs, pressurized air may then be applied periodically for cleaning the filter media. Periodically means every two or three or more revolutions. The pressurized air may be automatically introduced on a regularly timed basis or manually. The advantage of this type of filtering process is that filter media life is extended, particulates in the filtrate are reduced and cake moistures are lowered.

The use of independent valves on each of the disc filters permits all or one of the filters to be used in the system. This is advantageous on start ups as all of the vacuum can be directed to one of the filters. After a cake has been formed on the face of the filter the vacuum need is substantially reduced. At this point, another filter can be brought on stream and the process repeated.

In addition, the use of independent valves permits various operating parameters to be used on each of the discs to quickly determine the discs optimum operating parameters for a particular slurry. It also permits dissimilar slurries or feeds to be used at the same time as each filter can possess its own independent feed slurry tank and discharge chute.

In operation a continuous flow of feed is introduced into the feed tanks 28 through a feed connector line 27. To insure that the solids contained in the slurry remain in suspension and that the slurry contains a constant consistency, the discs may be adapted with paddles 110 for continuously agitating the slurry particularly at or near the bottom of the feed tank. The rotation of the disc filters can be varied from between 6 to 600 revolutions per hour. A vacuum equivalent of about 10 to 26 inches of mercury is normally used. The blow back normally utilizes pressurized air of between 1 to 30 pounds.

The diameter of the filter discs can vary broadly from about 1 feet to 24 feet. Since the filter media can be replaced without removing the segments of the disc, discs of 10 feet up to 24 feet in diameter can be constructed. With the larger discs, the filtering system would also include hand rails 112 and platforms 114 to permit operators to conveniently reach the filter segments and replace the filter media.

In addition to utilizing the filtering system of this invention as above described, the filtering system may also be adopted for use employing parallel and/or counter current wash systems. For example, a slurry may be dewatered by conventional means and the pulp collected in a repulper. Wash solutions are combined with the pulp and the pulp is reslurried. The reslurried pulp is then fed to an adjoining disc and the filtering process is repeated. By utilizing the separate valving system of this invention, washing can be accomplished as a counter current system, a parallel system or combinations thereof.

I claim:

1. A filter disc comprising a continuous, one piece circular rim having a continuous groove on both of its side faces whereby said groove's opening is less in width at its mouth than elsewhere, a center hub, an annular manifold fixed to the outer surface of said hub said manifold having a plurality of spaced apart openings on one of its side faces and also along its peripheral face, radial arms fixed at one end to said peripheral face of said manifold and at the other end to said inner wall of said circular rim, said radial arms having at least one groove in each of its side faces, said groove being in communication with said groove on said circular rim, a filter media support member having openings fixed between said radial arms to provide an internal passageway, said passageway being in communication with said openings along said peripheral face of said manifold, and a filter media overlying said filter media support member said filter media being fixed thereto by an overlying caulking media carried within said grooves.

2. The filter disc of claim 1 wherein said grooves on said circular rim and radial arms are trapezoidally shaped grooves.

3. The filter disc of claim 2 wherein said trapezoidal grooves on said circular rim and said trapezoidal grooves on said radial arms are in communication by means of feeder grooves extending from said peripheral grooves so as to form a substantially continuous fan shaped trapezoidal groove.

4. The filter disc of claim 3 wherein said circular rim includes a plurality of fixed paddles extending outwardly from its peripheral face.

5. The filter disc of claim 1 wherein said openings on said manifold's face are elongated and positioned near said hub.

6. The filter disc of claim 1 wherein said filter media support member having openings is a perforated face plate.

7. A continuous rotary vacuum disc filtering system comprising a filter support frame adapted to hold a plurality of separate slurry reservoirs and cake collecting bins, a plurality of vacuum discs having a grooved peripheral rim and an annular hub, said hub being fixed to a rotatable shaft supported on said support frame so that each of said disc filters will be in cooperative relationship with one of said slurry reservoirs and cake collecting bins, a plurality of equidistantly spaced grooved radial support arms extending from said grooved peripheral rim to said hub to divide said filter into segments, said groove on said radial arm being in communication with said groove on said peripheral rim and wherein said grooves have width openings, less at its mouth than elsewhere on said grooves, each of said segments having a filter media support member secured to said rim and radial arms to provide a passageway therebetween, a filter media overlying said filter media support member and said radial arms, said filter media being secured thereto by a caulking media overlying said filter media and imbedded within said grooves and a means for applying a vacuum to said passageway.

8. The continuous rotary vacuum disc filtering system of claim 7 including separate vacuum valving systems for each of said discs.

9. The continuous rotary vacuum disc filtering system of claim 8 wherein each of said filter media support members are perforated face plates.

10. The continuous vacuum filtering system of claim 8 wherein each of said discs includes a plurality of paddles extending outwardly from its peripheral face.

11. The continuous rotary vacuum disc filtering system of claim 7 wherein said grooves are trapezoidally shaped.

* * * * *